Feb. 6, 1940.　　　C. L. DAVIS　　　2,188,997
SEAT
Filed Jan. 2, 1937
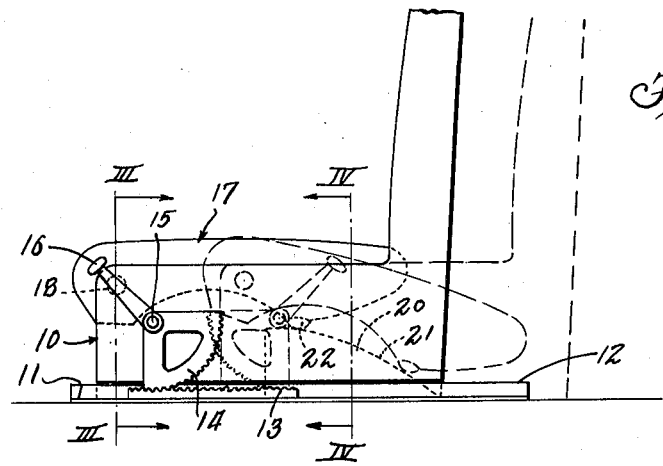
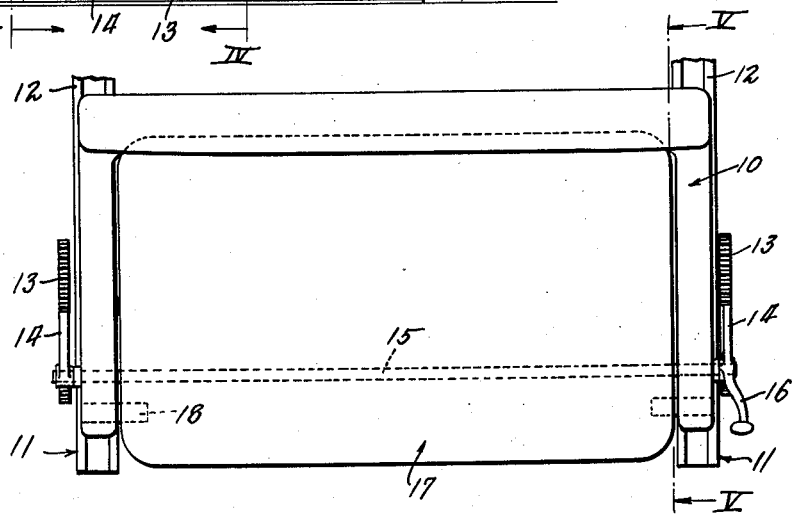
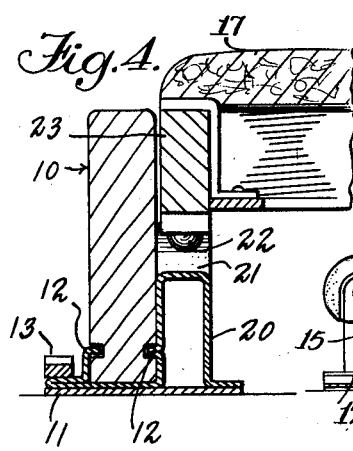
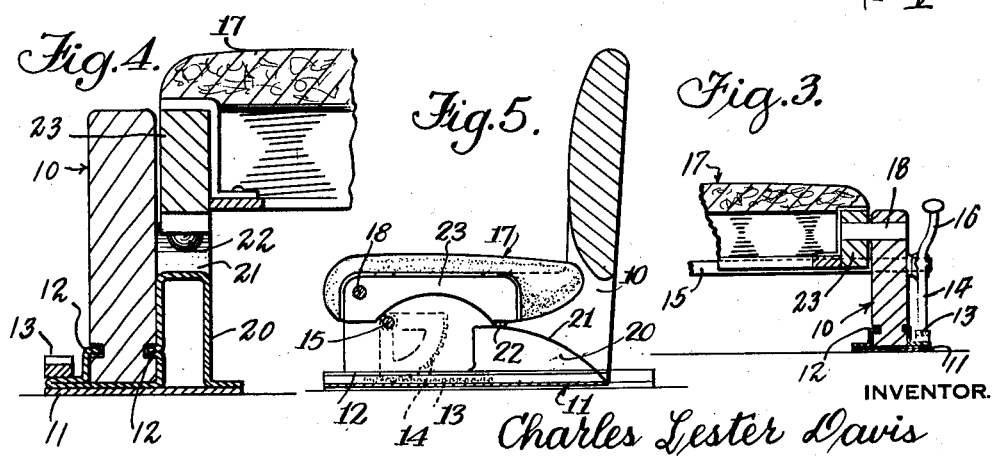
INVENTOR.
Charles Lester Davis
BY Lyon & Lyon
ATTORNEYS Patented Feb. 6, 1940

2,188,997

UNITED STATES PATENT OFFICE 2,188,997

SEAT

Charles Lester Davis, Santa Barbara, Calif.

Application January 2, 1937, Serial No. 118,708

5 Claims. (Cl. 155—14)

This invention relates to an improved construction for seats, chairs and the like adapted to support the human body, and is particularly directed toward a form of construction adaptable for use in conveyances such as, for example, automobiles, aircraft, trains and the like.

Investigations which have been carried on for a considerable period of time have disclosed that improper support of the body is the primary cause of the nerve strain and fatigue experienced by travellers in automobiles, railroad coaches and the like. In view of the peculiar bone structure of human beings, it is quite essential that, when in seated position, the weight be supported in large proportion by the femur or thigh bones, or thigh portions of the body. However, the usual seat construction causes the occupant to rest a considerable portion of his weight upon the coccyx and the imposition of weight upon this structure gives rise to many cases of sciatica, lumbago, sacroiliac difficulties and other ailments which involve the lower spine and pelvic group.

Furthermore, the driver's seat of an automobile or other conveyance should be adjustable in such manner that the driver, whether tall or short, is properly supported and within easy and ready grasp of the instruments, the line of sight of such driver being at a suitable elevation for clear vision. Heretofore seats have been provided whereby the distance of the seat from the controls or instruments could be varied but the eye level of a tall occupant would be very materially higher than the eye level of a short occupant, in many cases preventing the tall occupant from being comfortably seated without bending his neck in view of the proximity of the ceiling and in many other cases preventing the short occupant from seeing over the instrument panel. Furthermore, in such previous seats the tall occupant would generally have his knees in a raised position so that the entire weight of the body was supported by the pelvic region and coccyx. In other words, a characteristic of previous seat construction as used in conveyances required support of the body by its angularly related points and not by the normal planes of the body such as the planes forming the rear of the thighs.

The present invention is based upon the study of many individuals and the seating problems in various conveyances and at various positions. As a result of such investigation and study, the improved seat construction referred to hereinafter permits adjustment whereby the body is effectively supported, the greater proportion of weight being carried by the rear portion of the thighs, the construction of the seat permitting adjustment thereof so as to comfortably accommodate both tall and short occupants while maintaining their eye level substantially constant.

Reference is made to the accompanying drawing in which:

Fig. 1 is a side view of a seat embodying applicant's inventions;

Fig. 2 is a plan view of the seat shown in Figure 1.

Figs. 3 and 4 are vertical sections taken along the planes III—III and IV—IV, respectively, in Figure 1.

Fig. 5 is a section taken along the lines V—V of Figure 2.

A short man seated in the conventional automobile seat will have his eyes at a relatively low level and most of his weight will be carried by a narrow zone immediately back of the knees. A tall man, even though he has moved the seat away from the controls, is in an uncomfortable position requiring a cramping of the neck and back, his weight being supported by a small area adjacent the coccyx. His knees will be in dangerous proximity to the controls. The tall man is at further disadvantage in that the muscles of the abdomen are unduly tense, thereby inducing a spastic condition of the bowels and resulting fatigue. Similarly the muscles in the region of the knee (calf and lower thigh) are also under tension.

The short man, resting his weight primarily on the region immediately below the knee, restricts the circulation at this point and his back is under constant tension, which results in backache, lumbago and other sacroiliac troubles.

In seats built according to the principles of applicant's invention the occupants, whether tall or short, have their weight supported over a large area of the under thigh, in other words, their weight is supported upon a wide plane with no undue stress, tension or restriction.

Attention is called to the fact that when a tall person occupies the seat, the seat is moved rearwardly from the position occupied when a short man is seated and such rearward movement of the seat is accompanied by a simultaneous downward movement of the rear portion of the seat. The angulation of the back is not changed.

A form of seat construction coming within the scope of this invention is shown in Figs. 1 to 5 inclusive. As there shown, the seat is provided with end frames 10 which may extend upwardly to form ends of the back. These end frames 10 may be provided at their lower ends with opposing grooves cooperating with a formed metal slide member 11 having tongues 12 extending into grooves formed in the end member. The slide 11 is attached to the floor in any suitable manner. A portion of the slide 11 may be provided with an upwardly extending rack gear 13 with which a segment of a spur gear 14 may cooperate. The segmental spur gear 14 is pivotally connected to the end frame 10 as at 15 and is provided with a handle 16 so that when the handle is actuated the entire end frames 10 may be caused to move and assume different positions. If desired, the shaft 15 on which the segment 14 is mounted may extend beneath the seat to a similar segment at the opposite end so that both end frames are similarly and simultaneously moved upon actuating the handle 16.

Held between the end frames 10 is a seat 17 which is preferably pivoted to the ends 10 as by pins 18. The pins 18 are preferably approximately at the radius of curvature of the forward portion of the seat or from 2½ to 4 inches from the rounded forward edge or top of the seat adjoining the edge. The rear portion of the seat is adapted to move up and down to an extent proportional to the forward or backward movement of the end frames 10. It has been found that the movement of the rear portion of the seat 17 in the vertical plane should bear a ratio to the movement of the seat in a horizontal plane of between 2½ to 4 and 3½ to 4, since such proportionate movement more correctly and effectively supports persons of varying height.

In order to automatically provide for such vertical movement in the rear portion of the seat, the slide member 11 may be provided with a stationary incline 20 having a downwardly and rearwardly inclined face 21; as shown in Fig. 8, the stationary incline 20 may be hollow and integral with the slide member 11.

The seat 17 is provided with a roller, slide, button or other member adapted to rest upon, contact with or engage with the incline 20. The seat 17 is provided with a roller, button or shoe in engagement with or slidable upon the incline 20. In the drawing the button 22 is shown slidable upon the upper surface 21 of the incline 20, the button 22 being fastened to a side member 23 forming a part of the cushion or seat 17.

The ratio of height to length of the incline 20 is preferably within the limits of 2½ to 4 and 3½ to 4, or of any other suitable ratio capable of changing the vertical adjustment in the rear of the seat 17 within such ratios upon horizontal movement of the seat. The seat is shown in forward position in the drawing, in which position it is adapted to suitably support a short individual. In order to accommodate a tall individual, it is only necessary to move the handle member 16 toward the rear, thereby placing the seat in the position indicated by dotted lines, such rearward motion of the seat maintaining the front edge substantially in the same level but the rear portion of the seat will become depressed, thereby accommodating the longer body of the occupant without changing the eye level. The rearward motion will furthermore accommodate the longer legs of the individual, permitting him to maintain suitable foot contact with the controls.

It is to be noted that while the seat is being adjusted for occupants of different height, the incline of the back remains unchanged. For this reason, when the seat of this invention is used as the front or driver's seat of conveyances such as automobiles, adjustment of the seat for persons of different height will not change the inclination of the back and thereby place the driver in a completely relaxed position, in which position quick or sustained effort can not be readily accomplished. Instead, the driver is always in a poised or alert condition. Obviously, if the seat of this invention is to be used for passengers only, the back may be inclined toward the rear into a relaxed position wherein the weight of the body is supported more completely by outside means but in such case the change in angulation of the seat itself does not cause simultaneous change in angulation of the back.

The invention therefore contemplates a seat capable of horizontal movement in a front and rear direction, the front portion of the seat proper remaining in substantially the same horizontal plane during such horizontal movement whereas the rear or back portion of the seat proper moves up and down, thereby changing the angulation of the entire seat with respect to the horizontal.

Furthermore, the invention pertains to a construction and to an arrangement of elements whereby a desired vertical movement of the seat is produced in proportion to the horizontal movement, thereby permitting quick and ready adjustment of the seat to people of different stature.

I claim:

1. A conveyance seat comprising in combination with a floor, slide means fixed to said floor, end members at opposite ends of said seat carrying guide means, and adapted to be moved along said slide means in a front to rear direction, means carried by said end members and cooperating with said slide means to adjustably position said seat forwardly or rearwardly and impart front to rear movement thereto, a seat portion, means pivotally connecting the front of said seat portion with said end members, an incline means carried by the floor, and means on the rear of said seat portion riding upon said incline means whereby front to rear movement of said seat portion is converted into proportional vertical movement of the rear of said seat, whereby the thighs of both tall and short persons can be suitably supported by said seat and the eye level of said persons placed at virtually the same height.

2. A conveyance seat comprising in combination with a floor, slide means fixed to said floor, end members at opposite ends of said seat carrying guide means, and adapted to be moved along said slide means in a front to rear direction, means carried by said end members and cooperating with said slide means to adjustably position said seat forwardly or rearwardly and impart front to rear movement thereto, a seat portion, means pivotally connecting the front of said seat portion with said end members, an incline means carried by the floor, and means on the rear of said seat portion riding upon said incline means whereby front to rear movement of said seat portion is converted into proportional vertical movement of the rear of said seat.

3. An adjustable seating structure comprising the combination of: stationary slide means extending in a front to rear direction, end portions on opposite sides of said seating structure adapted to be moved along the slide means, a seat pivotally connected to each of said end portions at a point near the front top edge of the seating structure, a stationary incline means, and means carried by the rear of the seat to support said seat and riding upon the stationary incline means whereby front to rear movement of the seat is converted into proportional vertical movement of the rear of the seat.

4. An adjustable seating structure comprising the combination of: stationary slide means extending in a front to rear direction, end portions on opposite sides of said seating structure adapted to be moved along the slide means, a seat pivotally connected to each of said end portions at a point near the front top edge of the seating structure, means for adjustably positioning the end portions and seat along said slides, a stationary incline means below the level of the pivot points at the front of the seat, and means carried by the rear of the seat to support said seat and riding upon the stationary incline means whereby front to rear movement of the seat is converted into proportional vertical movement of the rear of the seat.

5. An adjustable seating structure comprising the combination of: stationary slide means extending in a front to rear direction, end portions on opposite sides of said seating structure adapted to be moved along the slide means, a seat pivotally connected to each of said end portions at a point near the front top edge of the seating structure, means for adjustably positioning the end portions and seat along said slides, a stationary incline means below the level of the pivot points at the front of the seat, and means carried by the rear of the seat to support said seat and riding upon the stationary incline means whereby front to rear movement of the seat is converted into proportional vertical movement of the rear of the seat whereby the thighs of both tall and short persons can be suitably supported by said seat and the eye level of said persons placed at virtually the same height.

CHARLES LESTER DAVIS.